May 5, 1964   M. S. RARICK ETAL   3,132,031
SAUSAGE DRYING METHOD
Filed March 30, 1961
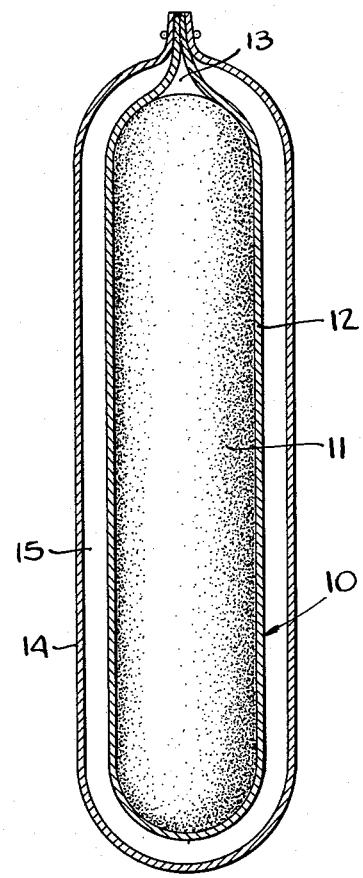
INVENTORS
MAURICE S. RARICK
ERNEST N. JARVIS
VIRGIL R. RUPP
BY
Kenyon & Kenyon
ATTORNEYS

3,132,031
SAUSAGE DRYING METHOD

Maurice S. Rarick, Indianapolis, Ernest N. Jarvis, Plainfield, and Virgil R. Rupp, Indianapolis, Ind., assignors to Hygrade Food Products Corporation, Detroit, Mich., a corporation of New York
Filed Mar. 30, 1961, Ser. No. 99,608
7 Claims. (Cl. 99—208)

This invention relates to a method of drying dry sausages.

In the manufacture of dry sausages, chopped or ground meat is mixed with spices, salt, sugar, and curing agents such as sodium nitrate or sodium nitrite, and the mixture is then stuffed into casings. The casings may be either natural or artificial, the latter being a relatively new development in which the casings are made from regenerated cellulose or collagen. Natural casings are made from animal intestines, for example.

The stuffed casing is then closed and the sausage is dried. The sausage may be smoked before drying. Heretofore, the drying period varied from approximately 20 to 120 days depending upon factors such as the humidity in the drying room, the type of casing which is used, the type of sausage being made, and the size of the sausage in terms of diameter or cross-sectional area.

It is, of course, necessary to maintain the drying room at a relative humidity which is sufficiently below saturation conditions in order to permit completion of the drying operation within a reasonable period of time. The interrelated factors of humidity and drying time are well known to those skilled in this art, sausage making being one of the oldest of the food processing industries.

As is known in the art, it is essential that the sausage be dried to a uniform moisture content throughout the cross-sectional area. If the sausage loses moisture too rapidly during the initial stages of the drying period, the surface thereof becomes hardened and a "crust" or "ring" develops immediately adjacent the casing. It appears that the reason for the hardening of the exterior portion of the sausage is due to the difference in moisture transmission capabilities of the sausage itself, on the one hand, and the moisture dissipation characteristics of the outer surface of the sausage. Thus, the outer surface is capable of dissipating moisture at a rate which is substantially higher than the rate at which moisture can diffuse through the sausage. Accordingly, the exterior portion of the sausage becomes over-dried and hardened because it is losing moisture at a rate which is substantially greater than the rate at which moisture is being supplied thereto from the center portion of the sausage.

This hardened "ring" inhibits the further transmission of moisture and therefore the center portion of such a sausage is underdried. Such a sausage, having an excessively moist center and a hardened overdried exterior, is obviously inferior in quality and is usually marketed as a second grade product.

The simple expedient of using higher relative humidities in the drying area to avoid the formation of the aforementioned hardened "ring" is not feasible for at least two reasons. In the first place, such increased humidity necessitates an increase in the drying period with consequent increase is cost.

Secondly, such increased humidity causes excessive mold growth on the surface of the sausage. This is a serious disadvantage since it promotes the formation of mold on sausages recently placed in the drying area. Also, such mold tends to decrease the shelf life of the sausage in retailing outlets.

An ideal drying cycle, with respect to humidity conditions, would involve the used of a high relative humidity at the outset of the drying operation. The use of this high relative humidity would assure the absence of the hardened "ring" formation described above. The reason that such higher humidity would eliminate the hardened "ring" is that the exterior of the sausage will not be able to dissipate as much moisture as previously. This higher relative humidity will have a minor effect on the rate at which moisture diffuses through the sausage itself. Consequently, the large difference between the rate of moisture diffusion through the sausage and the rate of moisture dissipation by the casing would be substantially eliminated, thereby eliminating the cause of the hardened "ring."

The second part of the ideal drying cycle would involve the use of lower relative humidities. Such lower humidities would serve to retard mold growth and would also accelerate the drying operation. The use of such lower humidity conditions would not produce the hardened formation since the sausage has already lost considerable moisture and the diffusion rate through the sausage will not be limiting. Thus, the rate of diffusion through the sausage will be approximately equal to the rate of dissipation on the exterior of the sausage. Simply stated, the sausage will have a much lower average moisture content at the beginning of the second part of the cycle and therefore will be able to tolerate the lower humidity conditions.

The attainment of such an ideal drying cycle would be very costly. Thus, sausage is made daily in most plants, and there are usually only one or two sausage drying rooms for a particular type of dry sausage which are used for drying the entire production. Since the drying period may be as long as 120 days, it is evident that within any one drying room there may be sausages made on any one of the manufacturing days from the first to last day of the 120 day period.

It would obviously be expensive to provide drying rooms for daily or even weekly sausage productions. As a consequence, the sausage industry has compromised with respect to the humidity conditions under which its sausage drying rooms are maintained. The compromise is by way of selecting an intermediate humidity and maintaining the drying area at this humidity throughout the drying period.

Accordingly, it is an object of this invention to provide a drying method for dry sausages which provides the advantages of an ideal drying cycle but which is economical in terms of additional cost.

It is a further object of this invention to provide a method of drying dry sausages which substantially eliminates the formation of a hardened outer portion.

It is another object of this invention to provide a method of drying dry sausages produced with artificial casings.

Briefly stated, the present invention relates to a drying method which involves the use of two sets of drying conditions. One of the two sets of drying conditions is in fact the temperature and relative humidity conditions of the drying atmosphere. The other set of drying conditions is achieved by the formation of a buffer zone completely surrounding the sausage, such buffer zone being maintained by fully enclosing the sausages within a moisture transmission barrier.

Illustrative of the practice of the present invention, a drying atmosphere is maintained at a certain set of relative humidity and temperature conditions. A buffer zone is provided for a sausage to be dried by completely surrounding the sausage with a moisture transmission barrier. The sausage enclosed within the barrier is then placed in the drying atmosphere.

As the drying commences, moisture diffuses through the sausage from the center portions thereof and subsequently diffuses through the sausage casing, entering the buffer zone. In this manner the moisture content of the buffer zone becomes greater than that of the drying atmosphere. This furnishes the driving force for the transmission of moisture through the barrier. In this manner the sausage is exposed to a high relative humidity. This satisfies the first requirement of the ideal drying cycle.

The second part of the ideal drying cycle is achieved in accordance with this invention by removing the barrier and thereby exposing the sausage to a lower relative humidity.

Since the first part of the drying operation was conducted under relatively high humidity conditions, the formation of the hardened "ring" is avoided. This second part of the drying cycle is then conducted at lower humidity conditions to accelerate drying and minimize mold growth.

The invention will be more readily understood when described in conjunction with the drawing which is an elevational view, partly in section, of a sausage to be dried in accordance with this invention.

With respect now more particularly to the drawing, there is depicted sausage 10 consisting of interior portion 11 and casing 12. As shown, casing 12 is fully enclosed at the top 13 of the sausage.

Also depicted is moisture transmission barrier 14 surrounding sausage 10 and thereby forming buffer zone 15.

In accordance with the present invention, sausage 10, after being stuffed and having its casing closed, is inserted within barrier 14 to provide a buffer zone 15 surrounding the sausage 10. The thus enclosed sausage is then introduced into a drying atmosphere maintained at constant relative humidity.

During the first part of the drying operation, moisture diffuses through interior portion 11, casing 12 and enters buffer zone 15. In this manner, the relative humidity of buffer zone 15 is increased above that in the drying area. This increase in humidity provides a driving force which causes diffusion of moisture through barrier 14.

Barrier 14 should preferably have moisture transmission characteristics which are such as to provide and maintain a relative humidity gradient of the order of from 10% to 40% across its boundaries. In other words, the moisture transmission ability must be high enough to permit moisture to diffuse at a reasonably high rate, but must be low enough to maintain the aforementioned relative humidity gradient.

As the drying progresses, the relative humidity in buffer zone 15 gradually decreases due to the decrease in the water content of interior 11. Since the drying atmosphere conditions are maintained relatively constant, the relative humidity on the exterior of barrier 14 remains essentially constant.

The moisture transmission barrier 14 is removed for the second part of the drying method of this invention. After such removal, casing 12 is in direct contact with the drying atmosphere, and the drying rate changes accordingly. Since the sausage is partially dried, the problem of the hardened formation is obviated.

A typical illustrative example involving the use of the present invention is the drying of a dry sausage produced with an artificial casing. The invention is of especial interest in this respect, since the moisture transmission characteristics of artificial casings are much greater than those of natural casings and consequently there is increased chance of encountering the hardened formation described above. In this illustrative example, barrier 14 is composed of matted cellulosic fibers which provide the necessary moisture transmission characteristics by diffusion and capillary action. Exemplary of such a barrier is paper or a paper product. If desired, the paper may be treated, for example by oil impregnation, to change its moisture transmission characteristics.

The sausage 10, enclosed in the fibrous cellulosic barrier is placed in a drying atmosphere maintained at approximately 60% relative humidity and approximately 50° F. The buffer zone 15, formed by the barrier 14, is maintained for a period of approximately 50 days.

The second part of the drying cycle is then commenced by the removal of barrier 14. This part of the drying cycle is conducted for at least approximately 5 additional days. In this manner, a first quality dry sausage is produced.

In the absence of the present inventive method, it would be virtually impossible to utilize artificial casings for the manufacture of dry sausage unless a very elaborate drying operation was devised. The high moisture transmission characteristics of artificial casing would require a very high initial relative humidity. These high humidity conditions, if maintained throughout the drying process, would require an inordinately long drying period and would result in substantial mold formation. Using a lower initial humidity would tend to produce the hardened formation discussed above.

The use of a moisture transmission barrier in accordance with this invention provides the high initial relative humidity conditions which are vital in the drying of a dry sausage having an artificial casing. As the drying progresses, the relative humidity in the buffer zone between the barrier and the sausage decreases since the source of moisture, the interior of the sausage, is being constantly depleted. Thus, the relative humidity in the buffer zone approaches the relative humidity which is maintained in the drying atmosphere.

After the moisture content of the sausage has been reduced to a point which virtually eliminates the hardened ring formation, the barrier is removed. It is not possible to positively define the point at which the barrier is removed since there are an infinite variety of dry sausages which may be produced, the parameters which may vary including the type of casing, the thickness of the casing, and the ingredients and additives used to make the sausage. However, in general it is preferable to keep the sausage within the barrier until at least fifty percent of the moisture to be removed has diffused out through the sausage casing. The removal of at least this much moisture substantially eliminates the possibility of hardened ring formation since the rate of moisture diffusion through the sausage will be approximately equal to the loss of moisture at the exterior surface. Optimum operation, in terms of producing high quality sausage, involves removal of approximately 75% to 80% of the moisture to be removed before the sausage is exposed directly to the atmosphere.

In the description and examples set forth above, the barrier has been discussed in terms of it being a single thickness. It is to be appreciated that more than one thickness may be used where drying conditions so dictate. Thus for example, the drying of certain type sausages may require a more gradual schedule of moisture removal. In such instance, for example, if two separate thicknesses or enclosures are employed, the first part of the drying operation is conducted utilizing both thicknesses. After a given quantity of moisture has been removed from the sausage, the outer thickness is removed. This has the effect of increasing the rate of transmission of moisture from the buffer zone into the drying atmosphere. Thus the relative humidity in the buffer zone decreases to an intermediate value which is between the relative humidity of the drying atmosphere and the relative humidity of the buffer zone at the time when two thicknesses were employed. After additional moisture is removed from the sausage, the remaining thickness is removed thereby exposing the sausage to the relative humidity of the drying atmosphere. In this manner, the sausage is progressively exposed to three different drying conditions, and the removal of moisture is made more gradual.

It is, of course, clear that any reasonable number of thicknesses may be employed and that the schedule of drying may be thus tailored to fit any drying requirements.

We claim:

1. The method of drying dry sausage having a casing thereon comprising the steps of enclosing said sausage within a moisture transmission barrier shaped to provide a buffer zone between said barrier and said sausage, said barrier being capable of supporting a relative humidity gradient, placing the enclosed sausage in a drying atmosphere whereby the relative humidity within said buffer zone increases to an initial value above that of said drying atmosphere, maintaining said enclosed sausage in said drying atmosphere at least until the relative humidity within said buffer zone decreases to a level below said initial value, and subsequently removing said barrier from around said sausage thereby exposing it directly to the said drying atmosphere.

2. The method of claim 1 in which said sausage has an artificial casing.

3. The method of claim 1 in which said barrier consists of one discrete thickness.

4. The method of drying dry sausage having a casing thereon comprising the steps of enclosing said sausage within a moisture transmission barrier which is capable of supporting a relative humidity gradient, placing the enclosed sausage in a drying atmosphere, maintaining said enclosed sausage in said drying atmosphere until at least one-half of the moisture to be removed has passed out of said sausage, and subsequently removing said barrier from around the said sausage thereby exposing it directly to the said drying atmosphere.

5. The method of claim 4 in which said barrier is composed of at least one discrete thickness of a fibrous cellulosic material.

6. The method of claim 4 in which said moisture transmission barrier is capable of maintaining a relative humidity gradient in the approximate range of 10% to 40% across its boundaries.

7. The method of drying dry sausage having a casing thereon comprising the steps of enclosing said sausage within a moisture transmission barrier shaped to provide a buffer zone between said barrier and said sausage, said barrier comprising a plurality of discrete thicknesses of a paper product capable of supporting a relative humidity gradient, placing said enclosed sausage in a drying atmosphere whereby the relative humidity within said buffer zone increases to an initial value above that of the said drying atmosphere, maintaining said enclosed sausage in said drying atmosphere at least until the relative humidity within said buffer zone decreases to a level below said initial value, subsequently removing the outermost of said discrete thicknesses, and then removing the remaining discrete thicknesses one at a time at intermittent intervals, thereby eventually exposing said sausage directly to the said drying atmosphere.

References Cited in the file of this patent

UNITED STATES PATENTS

| | | |
|---|---|---|
| 2,346,232 | Piret et al. | Apr. 11, 1944 |
| 2,386,826 | Wallach et al. | Oct. 16, 1945 |
| 2,704,260 | Heisler et al. | Mar. 15, 1955 |